(12) United States Patent
Ou (10) Patent No.: US 11,030,098 B2
(45) Date of Patent: Jun. 8, 2021

(54) CONFIGURABLE BURST OPTIMIZATION FOR A PARAMETERIZABLE BUFFER

(71) Applicant: Micron Technology, Inc., Boise, ID (US)

(72) Inventor: Michael Ou, Newark, CA (US)

(73) Assignee: Micron Technology, Inc., Boise, ID (US)

( * ) Notice: Subject to any disclaimer, the term of this patent is extended or adjusted under 35 U.S.C. 154(b) by 85 days.

(21) Appl. No.: 16/141,034

(22) Filed: Sep. 25, 2018

(65) Prior Publication Data

US 2020/0097406 A1 Mar. 26, 2020

(51) Int. Cl.
*G06F 12/0804* (2016.01)
(52) U.S. Cl.
CPC .............................. *G06F 12/0804* (2013.01)
(58) Field of Classification Search
CPC .................................................. G06F 12/0804
See application file for complete search history.

(56) References Cited

U.S. PATENT DOCUMENTS

| 6,708,258 | B1* | 3/2004 | Potter | G06F 13/385 710/52 |
|---|---|---|---|---|
| 8,880,788 | B1* | 11/2014 | Sundaram | G06F 3/0688 711/103 |
| 2007/0255770 | A1* | 11/2007 | Murase | G06F 3/0649 |
| 2015/0309827 | A1* | 10/2015 | Sarkar | G06F 9/45558 718/1 |
| 2015/0378740 | A1* | 12/2015 | Moyer | G06F 9/3867 714/758 |

* cited by examiner

*Primary Examiner* — Nanci N Wong
(74) *Attorney, Agent, or Firm* — Schwegman Lundberg & Woessner, P.A.

(57) ABSTRACT

An incoming write request received from a client is accessed. The incoming write request comprises a write command to transfer write data to a buffer memory. An initial portion of the write data is written to the buffer memory. An alignment of a final portion of the write data with respect to a memory bank width of the buffer memory is determined. The client is determined to be designated as a burst-overwrite client. In response to determining that the final portion of the write data is unaligned with the memory bank width of the buffer memory, the final portion of the write data is written to the buffer memory without preserving previously stored data based on the client being designated as a burst-overwrite client.

20 Claims, 6 Drawing Sheets

| 505 | | | |
|---|---|---|---|
| 0x0001_0203_0405_0607 | 0x0809_0a0b_0c0d_0e0f | 0x1011_1213_1415_1617 | 0x1819_1a1b_1c1d_1e1f |
| 0x2021_2223_2425_2627 | 0x2829_2a2b_2c2d_2e2f | 0x3031_3233_3435_3637 | 0x3839_3a3b_3c3d_3e3f |
| 0x4041_4243_4445_4647 | 0x4849_4a4b_4c4d_4e4f | 0x5051_5253_5455_5657 | 0x5859_5a5b_5c5d_5e5f |

| 510 | | | |
|---|---|---|---|
| 0xffff_ffff_ffff_ffff | 0xffff_ffff_ffff_ffff | 0xffff_ffff_ffff_ffff | 0xffff_ffff_ffff_ffff |
| 0xffff_ffff_ffff_ffff | 0xffff_ffff_ffff_ffff | 0xffff_ffff_ffff_ffff | 0xffff_ffff_ffff_ffff |
| 0xffff_ffff_ffff_ffff | 0xffff_ffff_ffff_ffff | 0xffff_ffff_ffff_ffff | 0xffff_ff5b_5c5d_5e5f ← 512 |

| 515 | | | |
|---|---|---|---|
| 0xffff_ffff_ffff_ffff | 0xffff_ffff_ffff_ffff | 0xffff_ffff_ffff_ffff | 0xffff_ffff_ffff_ffff |
| 0xffff_ffff_ffff_ffff | 0xffff_ffff_ffff_ffff | 0xffff_ffff_ffff_ffff | 0xffff_ffff_ffff_ffff |
| 0xffff_ffff_ffff_ffff | 0xffff_ffff_ffff_ffff | 0xffff_ffff_ffff_ffff | 0xffff_ff00_0000_0000 ← 517 |

CONFIGURABLE BURST OPTIMIZATION FOR A PARAMETERIZABLE BUFFER

TECHNICAL FIELD

Embodiments of the disclosure relate generally to memory sub-systems, and more specifically, relate to a configurable burst optimization for a parameterizable buffer.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to class-based dynamic memory slot allocation in a memory sub-system. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

In many instances, one or more of the memory components of the memory sub-system may be configured to include a buffer memory to store user and system data. Such memory components may be shared by multiple system components and processes. Each such component or processes, which are referred to as "clients," may submit read and write requests for the buffer memory. The memory sub-system may include a buffer manager to control the buffer memory components. The buffer manager is responsible for managing read and write transfer requests received from the multiple clients. The buffer manager may include an arbiter component to select which client has access to the buffer each clock cycle.

In a configurable parameterizable buffer manager architecture, a configurable number of client requestors are connected to the buffer manager to make requests to a shared buffer memory. The buffer manager supports allocated chunks of memory referred to as "slots." Clients write data to a slot, and then the same client or different clients may read the data back from that particular slot. Client transfers can be variable in size, but do not exceed a maximum allocated slot size. Typically, the transfer size is between 4 KB-8 KB, so the maximum slot size is fixed to the largest supported transfer size. The buffer manager is usually partitioned to contain many different slots so that multiple clients can read from and write to different slot locations at the same time.

The allocated memory physically comprises multiple memory components (e.g., static random access memory (SRAM) memory components), which may be referred to as "logical banks." Data is written to the buffer memory every cycle. The basic unit of access is a "bank word," which is a single memory bank width. For example, if a memory component is 128 bits (16 bytes) wide, the basic bank word access unit is 16 bytes, which is read from an individual bank. A "stripe" consists of all the bank words for a single address across a set of memory component instances. A "stripe" represents the minimum request access size that a client makes.

To maximize throughput, all memory banks are written to every cycle. However, to support simultaneous access by multiple clients and a more uniform request stream, the bank accesses are pipelined so that at any given time, only one bank is accessed by one requesting client in any cycle. Data written and read is striped across all banks, and a given client requestor will request access to one bank word from a bank each cycle across the different banks.

For many clients, burst-style transfers are used, where a chunk of data is written to sequential addresses from a starting address with a provided length. Data lengths are arbitrary in size and do not have to align to the memory bank width. For example, a burst transfer may be for a write of 4095 bytes starting at address 0. In this case, data is written from address 0 up to address 4094. The bursts are written one bank word at a time; thus, assuming a 16 byte wide bank word, a transfer of 4095 bytes would consist of 256 write operations of 16 bytes each, with the last write only having to write 15 bytes. For a physical memory component which has a memory bank word width of 128 bits (16 bytes), conventionally, the last leftover byte is preserved.

Memories typically have byte-write capability, so with a 16-word bank, masking out one byte write in the bank word may not normally be an issue. The leftover byte(s) scenario presents a problem when the full memory bank width is protected by an error-correcting code (ECC). In this case, the leftover bytes that are not written cannot be masked out, since ECC must be recalculated over the whole updated bank word. For example, a standard single-error-correcting, double-error-detecting code such as a Hamming code with parity would have 9 bits of ECC protecting an entire 128-bit word. If the first 15 bytes of the word are to be updated, with the last byte being unwritten, calculating the proper ECC would include reading the original data word from memory, merging the new 15 bytes with the original last byte, calculating the new ECC over the merged word, and writing the new merged word back into the memory. This requires an extra cycle of memory bandwidth for the read operation for the transfer to complete, which results in performance loss in the 128-bit case in terms of both memory throughput and latency.

Additional latency in the form of extra clock cycles may be incurred in the transfer if the original read data needs its ECC checked first before the merge, since timing margins may be tight and ECC check and correct may not be possible in a single cycle. Moreover, for certain conventional buffer manager architectures that do not perform the write immediately after the read, the latency can be even longer. For example, to preserve throughput, some conventional buffer manager architectures schedule the write in a subsequent arbitration request round. This means that the latency to complete a read-modify-write operation can be many cycles depending on how many additional clients request access to the buffer. For example, in a buffer manager with 31 clients, it may take an additional 31 clock cycles to get arbitration for the following write after the first read occurs.

Aspects of the present disclosure address the above and other deficiencies by providing a buffer manager with an enhanced read-modify-write scheme. The buffer manager has a configurable and parameterizable architecture. Clients of the buffer manager utilize pre-allocated fixed-size slots that the clients read data from and write data to. The buffer manager includes a client bridge for each client that provides an interface to the client. The buffer manager designates clients that write data to sequential addresses in slot memory as either "burst-overwrite" clients or "data-preserving" clients. "Data-preserving" clients are clients that need to preserve previously stored data in slots, and "burst-overwrite" clients are clients that do not need to preserve previously stored data in slots. Each client bridge includes an alignment checking component that determines an alignment of a final portion of data being transferred with respect to a target slot, and a finite-state machine (FSM) control to manage the transfer of the final portion into the target slot. The FSM control uses memory address, transfer, and configuration information to determine whether to perform a final read-modify-write operation to preserve previously stored data, or to perform a single burst-overwrite that does not preserve previously stored data based on whether the client is designated as a data-preserving client or a burst-overwrite client.

Performance gains over prior conventional buffer manager systems provided by the above-described aspects of the present disclosure depend on memory bank configuration, arbitration methodology, and transfer length. As an example, consider a conventional system with 4-banks that are each 16-byte-wide-bank (total stripe is 64 bytes) transferring 1023 bytes. In this example, the transfer length is not a multiple of the bank width of 16 bytes, which would result in at least one read-modify-write cycle. Transferring 1023 bytes would entail 16 total arbitration rounds, with each round consuming 4 clock cycles to write each stripe, that would complete over 64 clock cycles. In conventional implementations where the read-modify-write stalls the entire pipeline for a cycle, one additional cycle is introduced to perform the extra read, but since the entire pipeline is stalled for that cycle, this results in a throughput reduction during that cycle since no work can be done due to the pipeline stall. In the single read-modify-write request example, if one of the 16 arbitration rounds were stalled for one cycle, effective bandwidth loss would be $\frac{1}{16}$ or 6.25%. Shorter transfers suffer more. For example, a transfer with a transfer length of 511 bytes that is stalled for one cycle suffers a $\frac{1}{8}$ bandwidth degradation, or 12.5%. With the enhanced read-modify-write scheme addressed above, the pipeline stall may be avoided, which means this scheme improves buffer manager system throughput and reduces bandwidth degradation compared to traditional buffer manager systems.

In addition, the more active requestors performing a read-modify-write request, the greater the throughput loss. If, for example, there were 16 active requestors all performing a read-modify-write operation spreading across 16 arbitration rounds, the performance could drop by up to 50% since each of the 16 read-modify-write cycles occurs over 32 arbitration rounds, meaning bandwidth is halved. With the enhanced read-modify-write scheme addressed above, the read-modify-write cycle is eliminated, which means this scheme eliminates this performance loss.

While performing the read-modify-write operation during a separate arbitration round, as some traditional buffer manager systems do, helps minimize the loss of throughput, it has potential coherency issues that may not be acceptable in some memory sub-systems. In addition, in such traditional buffer manager systems, latency to complete the transfer is increased because the read request takes time to complete across an arbitration round, and the write occurs across a subsequent arbitration round. For example, in a traditional system with 8 banks, each arbitration cycle takes 8 cycles minimum for a request to pipeline across all banks. This means the addition of the extra read cycle will add 8 cycles to the latency to complete the request. In such a system, a 1023-byte transfer would take a total of 64 cycles (8 arbitration rounds*8 cycles) for write operations plus an additional 8 cycles for the read operation, which results in an additional 12.5% overhead to the latency. However, with the enhanced read-modify-write scheme addressed above, the additional read operation is avoided, thereby improving upon the foregoing latency issue in traditional systems.

Figure 1:
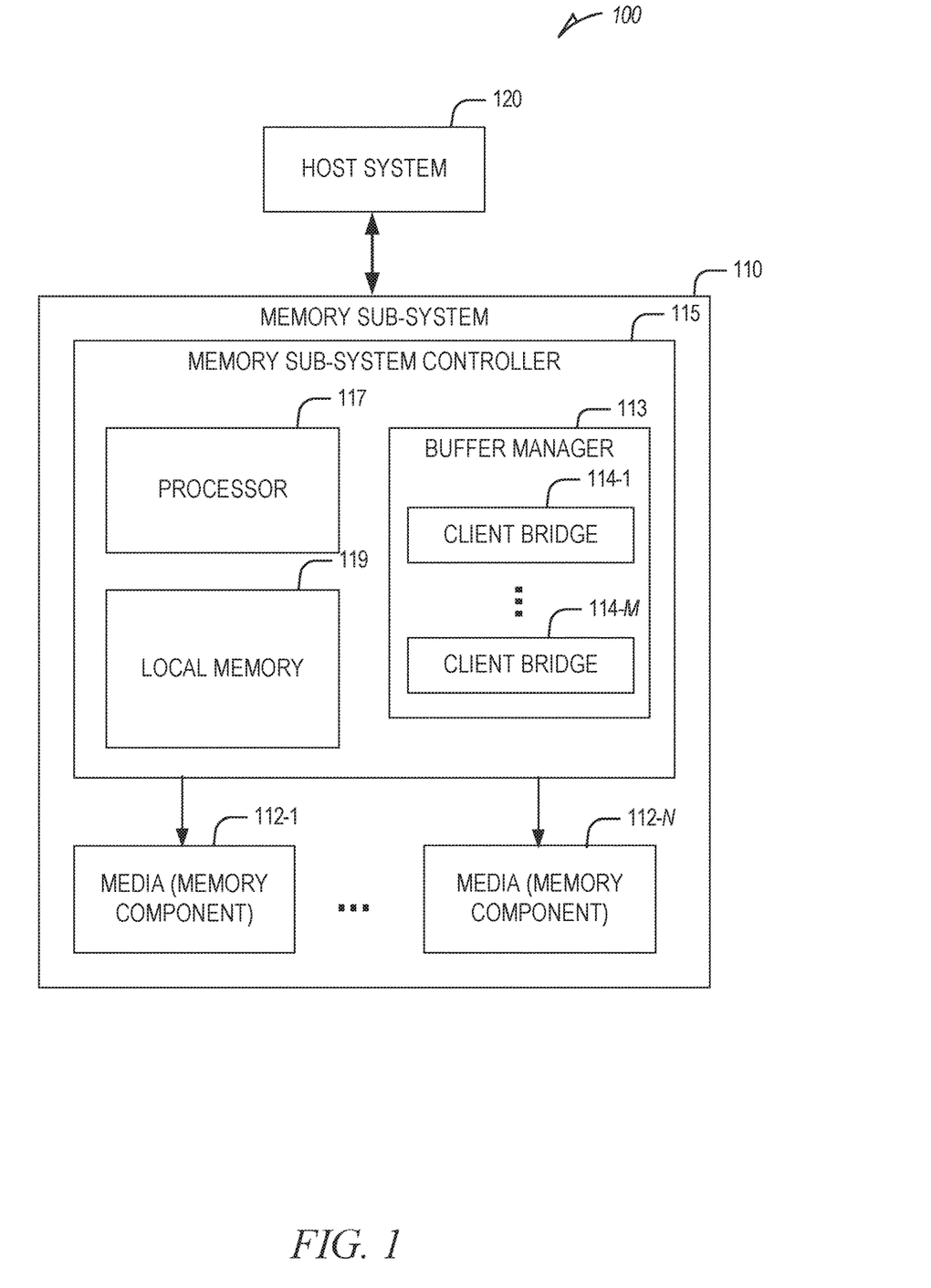
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112-1 to 112-N. The memory components 112-1 to 112-N can be volatile memory components, non-volatile memory components, or a combination of such. In some embodiments, the memory sub-system 110 is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS), etc. The physical host interface can be used to transmit data between the host system 120 and the memory sub-system 110. The host system 120 can further utilize an NVM Express (NVMe) interface to access the memory components 112-1 to 112-N when the memory sub-system 110 is coupled with the host system 120 by the PCIe interface. The physical host interface can provide an interface for passing control, address, data, and other signals between the memory sub-system 110 and the host system 120.

The memory components 112-1 to 112-N can include any combination of the different types of non-volatile memory components and/or volatile memory components. An example of non-volatile memory components includes a negative- and (NAND)-type flash memory. Each of the memory components 112-1 to 112-N can include one or more arrays of memory cells such as single-level cells (SLCs) or multi-level cells (MLCs) (e.g., triple-level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112-1 to 112-N can be based on any other type of memory such as a volatile memory. In some embodiments, the memory components 112-1 to 112-N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, as noted above, the memory cells of the memory components 112-1 to 112-N can be grouped as data blocks that can refer to a unit of the memory component used to store data.

A memory sub-system controller 115 (hereinafter referred to as a "controller") can communicate with the memory components 112-1 to 112-N to perform operations such as reading data, writing data, or erasing data at the memory components 112-1 to 112-N and other such operations. The controller 115 can include hardware such as one or more integrated circuits and/or discrete components, a buffer memory, or a combination thereof. The controller 115 can be a microcontroller, special-purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112-1 to 112-N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112-1 to 112-N. The controller 115 can further include host interface circuitry to communicate with the host system 120 via the physical host interface. The host interface circuitry can convert the commands received from the host system into command instructions to access the memory components 112-1 to 112-N as well as convert responses associated with the memory components 112-1 to 112-N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112-1 to 112-N.

The memory sub-system 110 includes a buffer manager 113 that manages access to a buffer memory and services multiple client requestors. The buffer memory may be included in the controller 115 or any one or more of the memory components 112-1 to 112-N. In some embodiments, the controller 115 includes at least a portion of the buffer manager 113. For example, the controller 115 can include a processor 117 (processing device) configured to execute instructions stored in local memory 119 for performing the operations described herein. In some embodiments, the buffer manager 113 is part of the host system 120, an application, or an operating system.

The buffer manager 113 manages read and write transfer requests for buffer memory components received from a configurable number of requestors (also referred to as "clients"). Each clock cycle, the buffer manager 113 determines which client has access to the buffer memory. As shown, the buffer manager 113 includes client bridges 114-1 to 114-M. Each client of the buffer memory has a client bridge, and each of the client bridges 114-1 to 114-M provides an interface to the buffer manager 113 to a corresponding client. Each of the client bridges 114-1 to 114-M receives and processes buffer memory requests (e.g., read or write) from the corresponding client. For write requests, data is transferred to the buffer memory one bank word at a time, and in instances in which the final portion of the write data is unaligned with a memory bank width of the buffer memory (e.g., the data length of the final portion of the write data is less than the memory bank width), the client bridge can either overwrite the previously stored data in the last bank or perform a read-modify-write operation to preserve the previously stored data. The client bridge determines whether to preserve the previously stored data based on a designation of the client. Firmware or another component of the memory sub-system 110 designates each client of the buffer manager 113 as either a data-preserving client or a burst-overwrite client. For data-preserving clients, the client bridge 114 preserves the previously stored data when writing the final portion of the write data, but for burst-overwrite clients, the client bridge 114 writes the final portion of the write data to the memory buffer without preserving the previously stored data. Further details with regard to the operations of the buffer manager 113 and the client bridges 114-1 to 114-M are described below.

Figure 2:
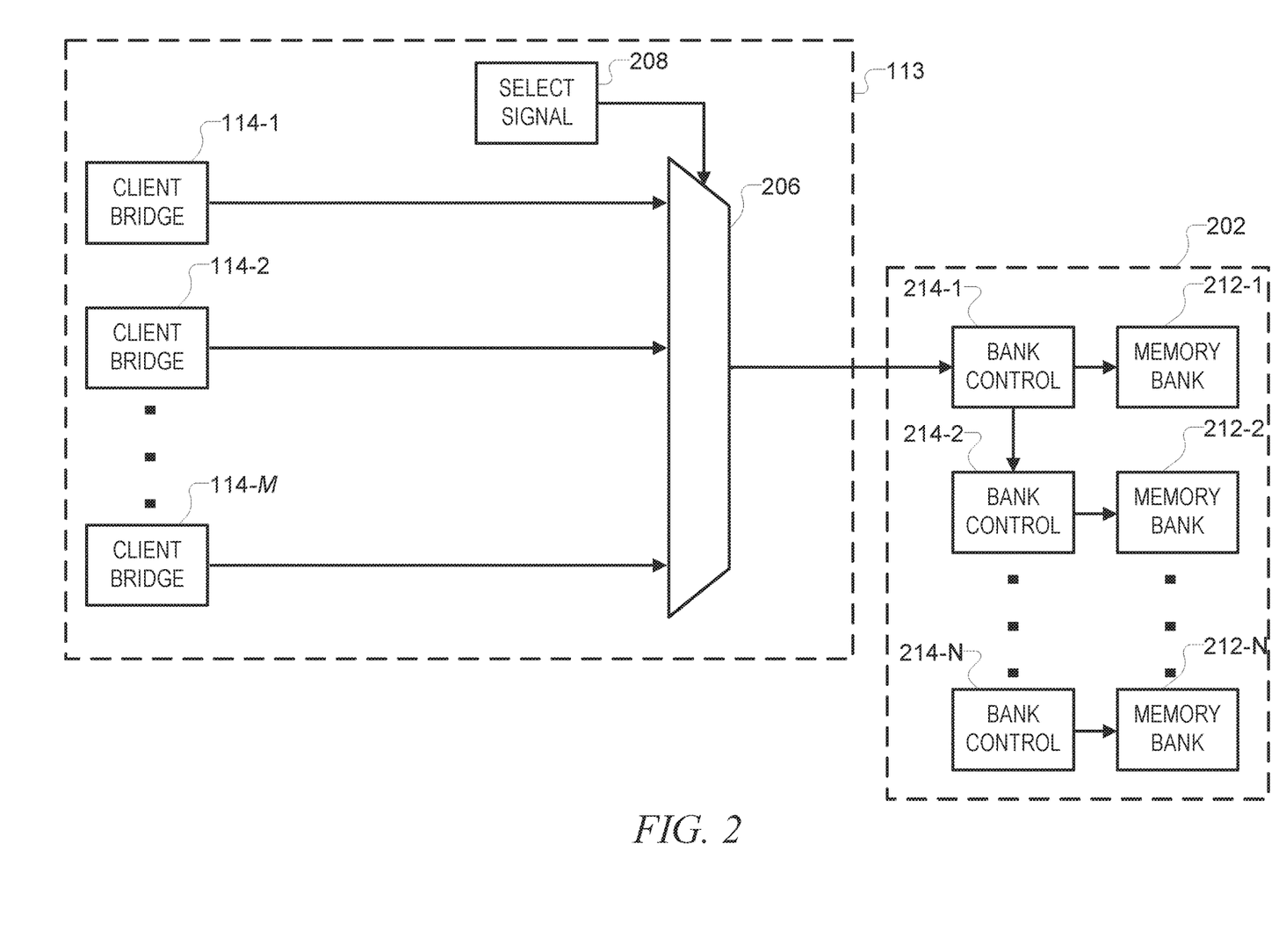
FIG. 2 is a block diagram illustrating components of a buffer manager in accordance with some embodiments of the present disclosure.

FIG. 2 is a block diagram illustrating components of the buffer manager 113 in accordance with some embodiments of the present disclosure. The buffer manager 113 manages access to a buffer memory 202. As shown, the buffer manager 113 includes client bridges 114-1 to 114-M. The client bridges 114-1 to 114-M present a uniform interface to the external clients of the buffer manager 113. A client bridge 114 exists for each external client, and provides a standard interface to the buffer manager 113 for the corresponding client. That is, each client makes stripe requests (e.g., read or write) to the buffer manager 113 through its connected client bridge 114.

In response to receiving a client request, the receiving client bridge 114 makes an arbitration request to an arbiter 206. For write requests, the client bridge 114 also stores the write data, and once arbitration is granted, the write data is immediately sent out of the client bridge 114 and transferred to the buffer memory 202. For read requests, once the arbitration request is granted, the data transfer from the buffer memory 202 immediately begins. Data being read from the memory components 112-1 to 112-N of FIG. 1 will be stored in an incoming first-in-first-out (FIFO) of the client bridge 114. This data will then be streamed out and sent to the requesting client on its clock domain. Further details regarding the client bridge 114 are discussed below in reference to FIG. 3.

The arbiter 206 selects which client has access to the buffer memory 202 at each clock cycle. As shown, the arbiter 206 receives a select signal 208. The select signal 208 provided to the arbiter 206 dictates which client has access to the buffer memory 202 at each clock cycle. The select signal 208 can, for example, employ a round robin scheme. If an unmasked arbitration request is provided by the selected client at an input of the arbiter 206, the request is granted and the client is granted access to the buffer memory 202 for that clock cycle. Otherwise, the selected client is denied access to the buffer memory 202 for that clock cycle.

The buffer memory 202 comprises memory banks 212-1 to 212-N. The memory banks 212-1 to 212-N can be included in the controller 115 or can be spread across one or more of the memory components 112-1 to 112-N. Each stripe request received from a client is for the same memory address across all memory banks 212-1 to 212-N. Memory bank controls 214-1 to 214-N respectively process requests received from the buffer manager 113 for the memory banks 212-1 to 212-N.

Figure 3:
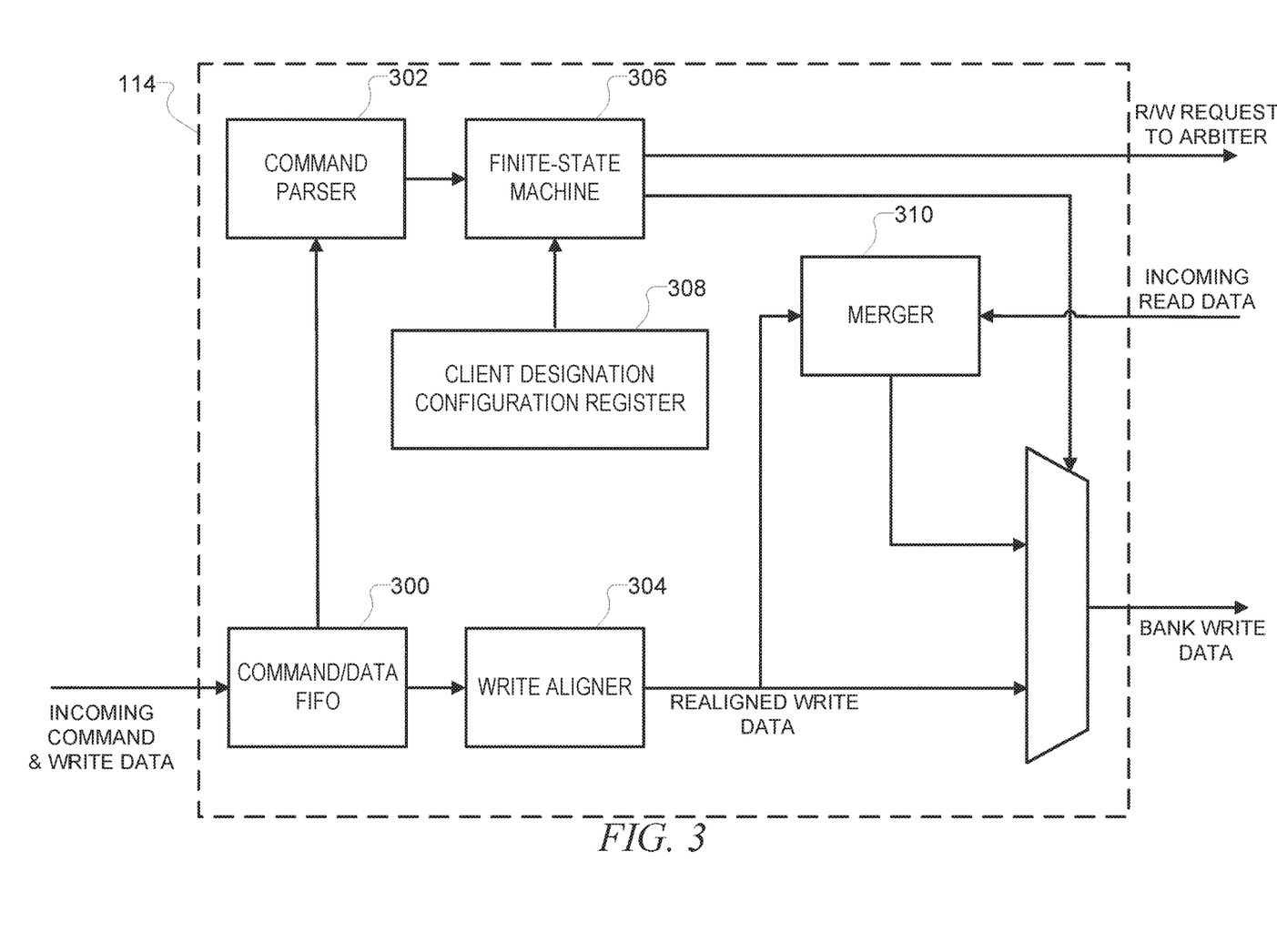
FIG. 3 is a block diagram illustrating components of a client bridge in accordance with some embodiments of the present disclosure.

FIG. 3 is a block diagram illustrating sub-components of a client bridge 114. As discussed above, the client bridge 114 provides an interface between the buffer manager 113 and one of multiple clients of the buffer memory 202. Accordingly, the client bridge 114 handles incoming requests from the client. Each incoming request comprises a command (e.g., read or write) along with a memory address and length of transfer. For write requests, the request is followed by an incoming burst of write data. The command and data burst exist on a shared command/data bus in order to reduce the number of signals for connectivity and routing simplicity.

The client bridge 114 packs incoming requests into a 64-bit command word and stores this in an input command/data first-in-first-out (FIFO) 300 for processing. For write requests, the write data is also stored in the command/data FIFO 300. A command parser 302 parses incoming requests to determine whether the request includes a write command or a read command.

In response to receiving a client request, the client bridge 114 makes an arbitration request to the buffer manager 113. For write requests, once arbitration is granted, the write data is immediately sent out of the command/data FIFO 300 in the following clock cycle and transferred to the buffer memory 202. Data is written out one bank word at a time to the target memory to the beginning of the designated slots. Slots are aligned to the memory bank start to avoid read-modify-write operations at the beginning of each transfer. A write aligner 304 manages internal data alignment including padding control for unaligned transfers.

For the final bank-word transfer, a finite-state machine (FSM) 306 determines whether to preserve previously stored data. To do so, the FSM 306 determines whether a data length of a final portion of the write data is aligned with a memory bank width of the buffer memory 202. That is, the FSM 306 calculates whether the portion of the write data that is remaining to be transferred would fill a whole bank word. If the final portion of the write data fills a whole bank word, the data is written to the target memory bank as-is. Otherwise, the FSM 306 determines how to handle the transfer of the final portion of the write data based on a designation of the client.

The FSM 306 determines the designation of the client by accessing a client designation from a client designation configuration register 308. A client may be designated either as a "burst-overwrite client" or as a "data-preserving client." System firmware may apply a designation to each client based on a function of the client. For example, a burst-overwrite client typically transfers data in a streaming burst pattern into the start of the slot, and then continually fills the slot with data until the transfer is done. Once the slot data is written, it is consumed by a downstream client and the slot is not written to again. Examples of such clients include a Host Interface Controller that streams 4K-byte logical blocks into the buffer manager 113 to be stored temporarily, analyzed, and then read out shortly thereafter by downstream data path units. Another example burst-overwrite client is a low-density parity-check (LDPC) encoder client that reads data, calculates the corresponding LDPC protection parity bytes, and then writes the final data and LDPC bytes back to the buffer memory to be read out later by a downstream flash engine that writes that data to flash. Yet another example of a burst-overwrite client is an LDPC decoder that corrects raw data read from flash, and then writes the corrected data back to be eventually returned to a host system. An example of a data-preserving client is a CPU entity that allocates a slot as a temporary working buffer, and then randomly performs reads and writes at locations throughout that slot.

For burst-overwrite clients, the FSM 306 writes the final portion of the write data to the target memory bank without preserving the previously stored data. That is, the FSM 306 overwrites the previously stored data. Prior to the FSM 306 overwriting the previously stored data, the write aligner 304 pads the final portion of the write data with padding bytes to align the data length of the final portion of the write data with the memory bank width. The write aligner 304 can pad the final portion of the write data with zeros or random data.

For data-preserving clients, the FSM 306 performs a read-merge-write operation to preserve the previously stored data. More specifically, a merger 310 receives incoming read data (i.e., the previously stored data) and merges it with the final portion of the write data. The FSM 306 writes the merged data to the final bank of the buffer memory.

Figure 4:
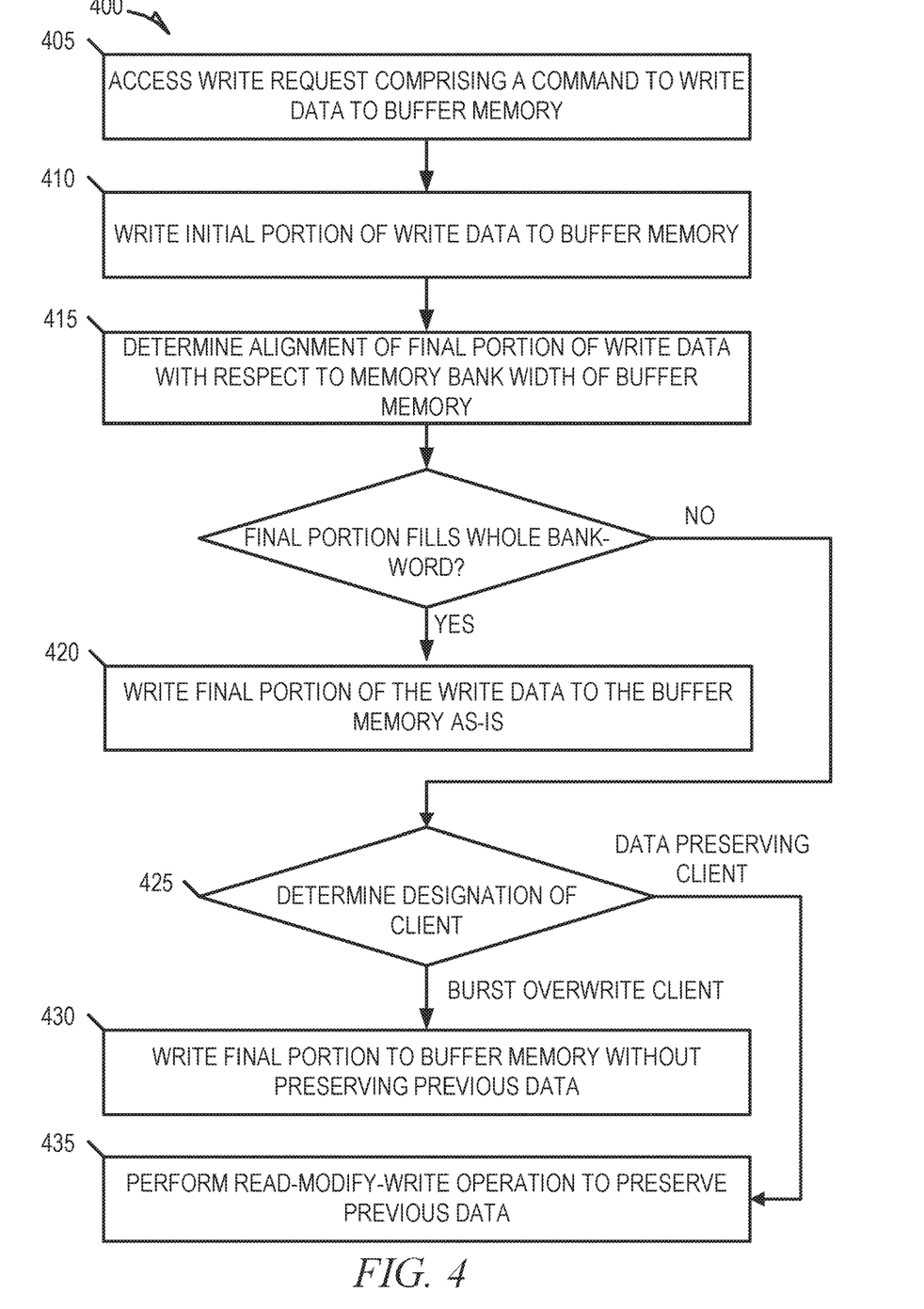
FIG. 4 is a flow diagram illustrating an example method to optimize burst write operations in a memory sub-system in accordance with some embodiments of the present disclosure.

FIG. 4 is a flow diagram illustrating an example method 400 to optimize burst write operations in a memory sub-system in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the client bridge 114 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device accesses a write request received from a client. The write request includes a command to transfer write data to a target memory bank in a buffer memory. The write request specifies an address of the target memory bank and a length of the write data.

At operation 410, the processing device writes an initial portion of the write data to the target memory bank in the buffer memory. The processing device transfers one bank word of the write data at each cycle. The initial portion of the write data includes all write data except for a final portion of the write data that has a data length of a bank word or less.

At operation 415, the processing device determines an alignment of the final portion of the write data with respect to a memory bank width of the buffer memory. More specifically, the processing device determines whether a data length of the final portion of the write data is aligned with the memory bank width of the buffer memory. That is, the processing device calculates whether the final portion of the write data that is remaining to be transferred would fill a whole bank word.

If the processing device determines that the final portion of the write data is aligned with the memory bank width of the buffer memory, then at operation 420, the processing device writes the final portion of the write data to the buffer memory as-is.

If the processing device determines that the final portion of the write data is unaligned with the memory bank width of the buffer memory (e.g., the final portion of the write data does not fill a whole bank word), the processing device determines whether to preserve previously stored data in the buffer memory based on a designation of the client. Accordingly, at operation 425, the processing device determines a designation of the client. The processing device can determine the designation of the client by accessing a configuration register that stores client designations for a plurality of clients of the buffer memory. The client may be designated as a data-preserving client or a burst-overwrite client.

If the client is designated as a burst-overwrite client, the processing device, at operation 430, writes the final portion of the write data to the buffer memory without preserving the previously stored data. That is, the processing device overwrites the previously stored data. Before overwriting the previously stored data, the processing device pads the final portion of the write data with one or more padding bytes. The padding bytes can be zeros or random numbers.

If the client is designated as a data-preserving client, the processing device, at operation 435, performs a read-modify-write operation to preserve the previously stored data. The read-modify-write operation comprises reading the previously stored data from the buffer memory, merging the final portion of the write data with the previously stored data, and writing the merged data to the buffer memory.

Figure 5:
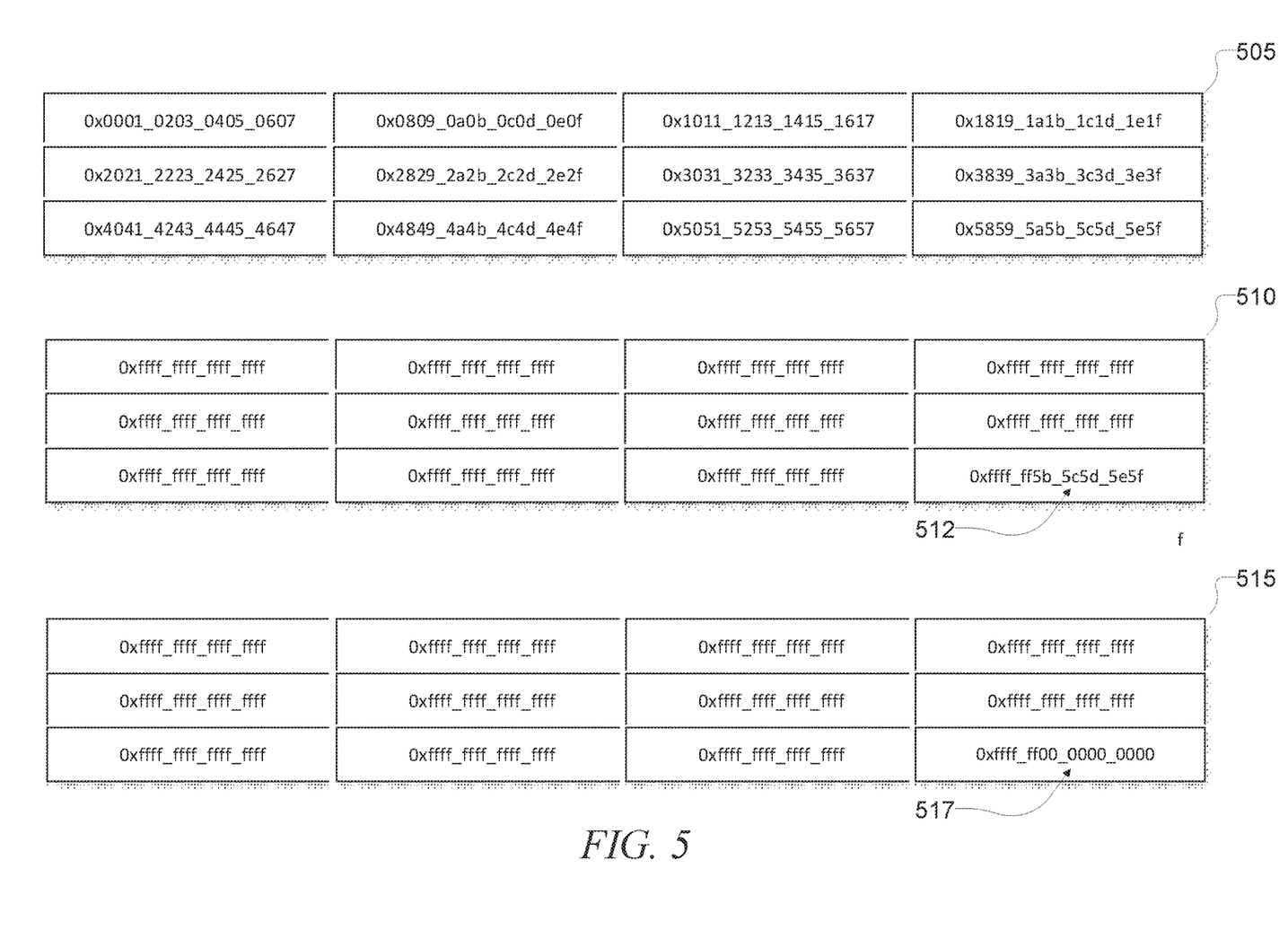
FIG. 5 is a conceptual diagram illustrating the example method to optimize burst write operations in a memory sub-system in accordance with some embodiments of the present disclosure.

FIG. 5 is a conceptual diagram illustrating an example application of the method 400 to optimize burst write operations in a memory sub-system in accordance with some embodiments of the present disclosure. The example illustrated in FIG. 5 corresponds to a write request to write 91 bytes total of a pattern of all ones (i.e., 0xff). In this example, a buffer memory includes four banks, and each bank word is 8 bytes wide. Hence, the stripe width is 32 bytes. Thus, the 91-byte transfer spans across three stripes (12 bank words total). At block 505, data stored in the buffer memory prior to executing the write request is shown.

Block 510 illustrates a process of executing the write request for a client designated as a data-preserving client. As shown, there are eleven full bank words worth of data in an initial portion of the write data, with three extra bytes that form the final portion of the write data to be transferred. To write the three bytes from the final portion of the write data, a read operation is performed to read the original data, followed by a cycle to merge the original data with the final portion of the write data, which is followed by a write back of the merged data. The write back can be performed the following cycle in pipeline-stall implementations or may occur in another arbitration cycle. A result of this read-modify-write operations is shown at element 512.

For a client designated as a burst-overwrite client, which is illustrated at block 515, the initial eleven bank word transfers occur the same as for the data-preserving client. Since the burst-overwrite client does not require the original data to be preserved, the processing device can completely overwrite the previously stored data in the twelfth bank by writing the remaining three bytes of write data and padding the rest of the bank with zeros (or any other random data that is available). A result of this process is illustrated at element 517.

In comparison to the process used for completing the write request for the data-preserving client, the process used for completing the write request for the burst-overwrite client avoids an entire read cycle and read-modify-write operation. As a result, the overall latency for completing the request is improved and the overall buffer manager utilization is also improved since an extra read is avoided.

Figure 6:
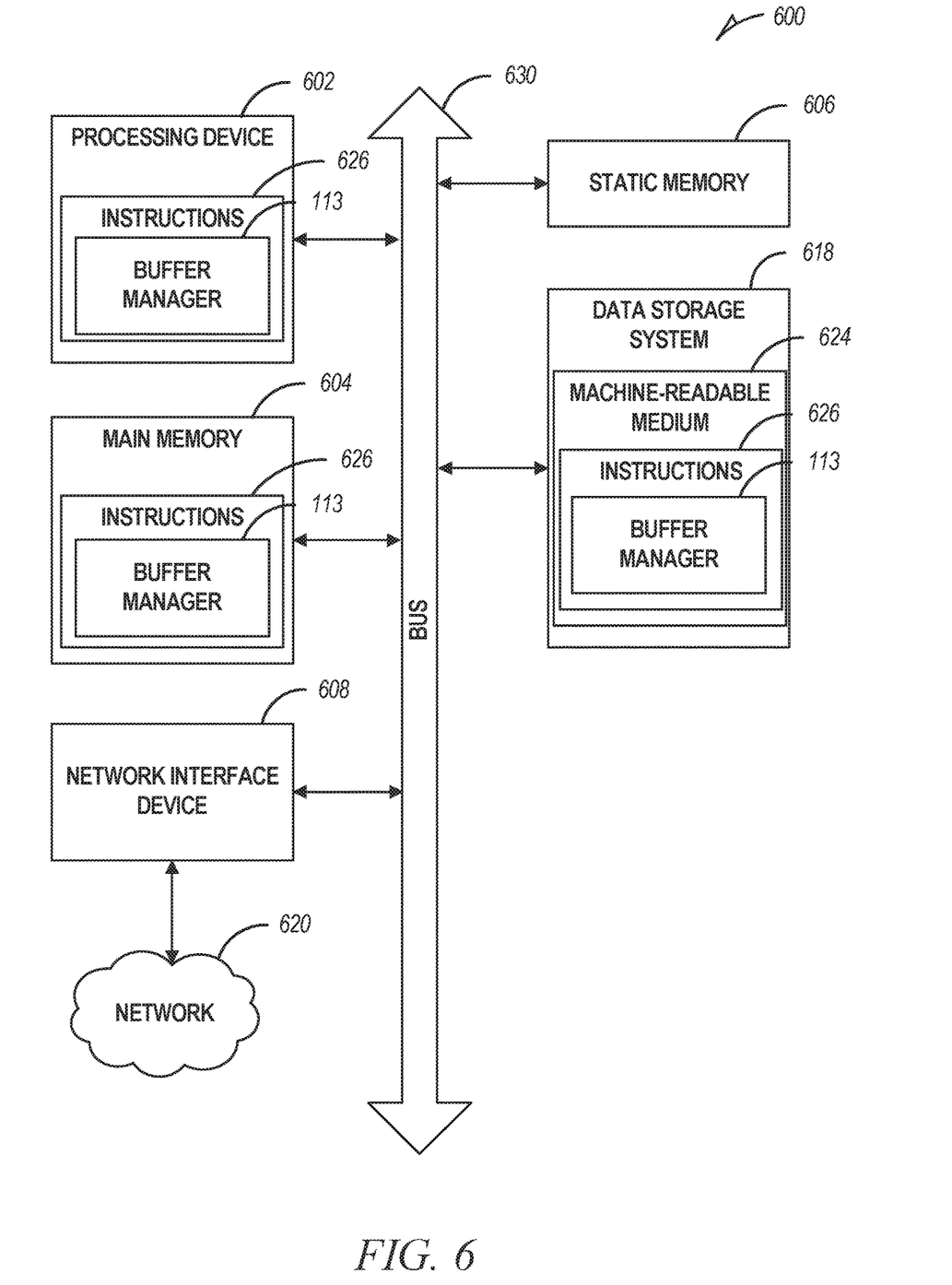
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the buffer manager 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory allocation system (e.g., the buffer manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., a computer-readable) storage medium such as a read only memory (ROM), a random access memory (RAM), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

EXAMPLES

Example 1 is a system comprising: a plurality of memory components, at least one of the memory components being configured as a buffer memory; and a processing device, operatively coupled with the plurality of memory components, to perform operations comprising: accessing an incoming write request received from a client, the incoming write request comprising a write command to transfer write data to the buffer memory; writing an initial portion of the write data to the buffer memory; determining an alignment of a final portion of the write data with respect to a memory bank width of the buffer memory; determining the client is designated as a burst-overwrite client; and in response to determining that the final portion of the write data is unaligned with the memory bank width of the buffer memory, writing the final portion of the write data to the buffer memory without preserving data previously stored in the buffer memory based on the client being designated as a burst-overwrite client.

In Example 2, the subject matter of Example 1 optionally comprises determining that the final portion of the write data is unaligned with the memory bank width of the buffer memory by determining that a length of the final portion of the write data is less than the memory bank width of the buffer memory.

In Example 3, the subject matter of any one of Examples 1 and 2 optionally comprises writing the final portion of the write data to the buffer memory by overwriting the data previously stored in the buffer memory.

In Example 4, the subject matter of any one of the Examples 1-3 optionally comprises overwriting of the previously stored data by padding the final portion of the write data with one or more padding bytes to align a length of the final portion of the write data with the memory bank width.

In Example 5, the subject matter of any one of Examples 1-4 optionally further comprises a configuration register to store client designations for a plurality of clients, and the determining that the client is designated as a burst-overwrite client comprises accessing the configuration register.

In Example 6, the subject matter of any one of Examples 1-5 optionally further comprises assigning a designation to each client of the plurality of clients based on a function of each client.

Example 7 includes the subject matter of any one of Examples 1-6 where the incoming write request is optionally a first write request; the write command is optionally a first write command to transfer first write data to the buffer memory; the client is optionally a first client; a second client is optionally designated as a data-preserving client; and the processing device is to optionally perform further operations comprising: accessing a second incoming write request received from the second client, the second incoming write request comprising a second write command to transfer second write data to the buffer memory; writing an initial portion of the second write data to the buffer memory; determining an alignment of a final portion of the second write data with respect to the memory bank width of the buffer memory; and based on a designation of the second client and based on determining that the final portion of the second write data is unaligned with the memory bank width of the buffer memory, performing a read-modify-write operation to write the final portion of the second write data to the buffer memory and preserve previously stored data in the buffer memory.

In Example 8, the subject matter of claim 7 optionally comprises performing the read-modify-write operation by performing operations comprising: reading the previously stored data from the buffer memory; merging the previously stored data with the second write data to generate merged data; and writing the merged data to the buffer memory.

Example 9 includes the subject matter of any one of Examples 1-8 where the incoming write request is optionally a first write request; the write command is optionally a first write command to transfer first write data to the buffer memory; and the processing device is to optionally perform further operations comprising: accessing a second incoming write request received from the client, the second incoming write request comprising a second write command to transfer second write data to the buffer memory; writing an initial portion of the second write data to the buffer memory; determining that a final portion of the second write data is aligned with the memory bank width of the buffer memory; and in response to determining that the final portion of the second write data is aligned with the memory bank width of the buffer memory, writing the final portion of the second write data to the buffer memory.

Example 10 is a method comprising: accessing an incoming write request received from a client, the incoming write request comprising a write command to transfer write data to a buffer memory; writing an initial portion of the write data to the buffer memory; determining that a final portion of the write data is unaligned with a memory bank width of the buffer memory; determining a designation of the client, the client being designated as either a burst-overwrite client or a data preserving client; and in response to determining that the final portion of the write data is unaligned with the memory bank width of the buffer memory, determining whether to preserve previously stored data in the buffer memory based on the designation of the client.

In Example 11, the subject matter of Example 10 optionally further comprises writing the final portion of the write data to the buffer memory without preserving the previously stored data based on the client being designated as a burst-overwrite client.

In Example 12, the subject matter of any one of Examples 10 and 11 optionally comprises writing the final portion of the write data to the buffer memory by overwriting the previously stored data.

In Example 13, the subject matter of any one of Examples 10-13 optionally comprises overwriting of the previously stored data by padding the final portion of the write data with one or more padding bytes to align a length of the final portion of the write data with the memory bank width.

In Example 14, the subject matter of Example 10 optionally further comprises performing a read-modify-write operation to write the final portion of the write data to the buffer memory and preserve the previously stored data in the buffer memory based on the client being designated as a data-preserving client.

In Example 15, the subject matter of Example 14 optionally comprises performing the read-modify-write operation comprises: reading the previously stored data from the buffer memory; merging the previously stored data with the write data to generate merged data; and writing the merged data to the buffer memory.

Example 16 includes the subject matter of any one of Examples 10-15 where the incoming write request is optionally a first write request; the write command is optionally a first write command to transfer first write data to the buffer memory; and the method optionally further comprises: accessing a second incoming write request received from the client, the second incoming write request comprising a second write command to transfer second write data to the buffer memory; writing an initial portion of the second write data to the buffer memory; determining that a final portion of the second write data is aligned with the memory bank width of the buffer memory; and in response to determining that the final portion of the second write data is aligned with the memory bank width of the buffer memory, writing the final portion of the second write data to the buffer memory.

In Example 17, the subject matter of any one of Examples 10-16 optionally comprises determining the designation of the client by accessing a configuration register that stores client designations for a plurality of clients.

In Example 18, the subject matter of any one of Examples 10-17 optionally comprises assigning a designation to each client of the plurality of clients based on a function of each client.

Example 19 is a non-transitory computer-readable storage medium comprising instructions that, when executed by a processing device, cause the processing device to perform operations comprising: accessing an incoming write request received from a client, the incoming write request comprising a write command to transfer write data to a buffer memory; writing an initial portion of the write data to the buffer memory; determining that a final portion of the write data is unaligned with a memory bank width of the buffer memory; determining a designation of the client, the client being designated as either a burst-overwrite client or a data preserving client; and in response to determining that the final portion of the write data is unaligned with the memory bank width of the buffer memory, determining whether to preserve previously stored data in the buffer memory based on the designation of the client.

In example 20, the subject matter of Example 19 optionally further comprises performing a read-modify-write operation to write the final portion of the write data to the buffer memory and preserve the previously stored data in the buffer memory based on the client being designated as a data-preserving client; and writing the final portion of the write data to the buffer memory without preserving the previously stored data based on the client being designated as a burst-overwrite client.

What is claimed is:

1. A method comprising:
   designating each client of a buffer memory as either a burst over-write client or a data preserving client based on a function performed by each client;
   accessing an incoming write request received from a client of the buffer memory, the incoming write request comprising a write command to transfer write data to the buffer memory;
   writing an initial portion of the write data to the buffer memory;
   determining that a final portion of the write data is unaligned with a memory bank width of the buffer memory;
   determining a designation of the client by accessing a configuration register that stores client designations for a plurality of clients of the buffer memory, the designation of the client indicating whether data previously stored in the buffer memory is to be preserved when writing the final portion of the write data to the buffer memory, the client being designated as either a burst-overwrite client or a data preserving client; and
   in response to determining that the final portion of the write data is unaligned with the memory bank width of the buffer memory, determining whether to preserve previously stored data in the buffer memory based on the designation of the client.

2. The method of claim 1, further comprising:
   writing the final portion of the write data to the buffer memory without preserving the previously stored data based on the client being designated as a burst-overwrite client.

3. The method of claim 2, wherein the writing of the final portion of the write data to the buffer memory comprises overwriting the previously stored data.

4. The method of claim 3, wherein the overwriting of the previously stored data comprises padding the final portion of the write data with one or more padding bytes to align a length of the final portion of the write data with the memory bank width.

5. The method of claim 1, further comprising:
   performing a read-modify-write operation to write the final portion of the write data to the buffer memory and preserve the previously stored data in the buffer memory based on the client being designated as a data-preserving client.

6. The method of claim 5, wherein the performing the read-modify-write operation comprises:
   reading the previously stored data from the buffer memory;
   merging the previously stored data with the write data to generate merged data; and
   writing the merged data to the buffer memory.

7. The method of claim 1, wherein:
   the incoming write request is a first write request;
   the write command is a first write command to transfer first write data to the buffer memory; and
   the method further comprises:
      accessing a second incoming write request received from the client, the second incoming write request comprising a second write command to transfer second write data to the buffer memory;
      writing an initial portion of the second write data to the buffer memory;
      determining that a final portion of the second write data is aligned with the memory bank width of the buffer memory; and
      in response to determining that the final portion of the second write data is aligned with the memory bank width of the buffer memory, writing the final portion of the second write data to the buffer memory.

8. The method of claim 1, wherein the client being designated as a burst-overwrite client indicates that the data previously stored in the buffer memory is to be overwritten with the final portion of the write data.

9. The method of claim 8, each client of the buffer memory is a component or process of a memory sub-system that includes the buffer memory.

10. A system comprising:
    a memory device configured as a buffer memory that is accessible by a plurality of clients; and a processing device, operatively coupled with the memory device, to perform operations comprising:
designating each client of the buffer memory as either a burst over-write client or a data preserving client based on a function performed by each client;
accessing an incoming write request received from a client, the incoming write request comprising a write command to transfer write data to the buffer memory;
writing an initial portion of the write data to the buffer memory;
determining an alignment of a final portion of the write data with respect to a memory bank width of the buffer memory;
determining a designation of the client by accessing a configuration register that stores client designations for each of the plurality of clients, the designation of the client indicating whether data previously stored in the buffer memory is to be preserved when writing the final portion of the write data to the buffer memory;
determining, based on accessing the configuration register, that the client is designated as a burst-overwrite client; and
in response to determining that the final portion of the write data is unaligned with the memory bank width of the buffer memory, writing the final portion of the write data to the buffer memory without preserving the data previously stored in the buffer memory based on the client being designated as a burst-overwrite client.

11. The system of claim 10, wherein determining that the final portion of the write data is unaligned with the memory bank width of the buffer memory comprises determining that a length of the final portion of the write data is less than the memory bank width of the buffer memory.

12. The system of claim 10, wherein the writing of the final portion of the write data to the buffer memory comprises overwriting the data previously stored in the buffer memory.

13. The system of claim 12, wherein the overwriting of the previously stored data comprises padding the final portion of the write data with one or more padding bytes to align a length of the final portion of the write data with the memory bank width.

14. The system of claim 10, wherein the client being designated as a burst-overwrite client indicates that the data previously stored in the buffer memory is to be overwritten with the final portion of the write data.

15. The system of claim 14, wherein:
each client of the buffer memory is a component or process of the system.

16. The system of claim 10, wherein:
the incoming write request is a first write request;
the write command is a first write command to transfer first write data to the buffer memory;
the client is a first client;
a second client is designated as a data-preserving client; and
the processing device is to perform further operations comprising:
accessing a second incoming write request received from the second client, the second incoming write request comprising a second write command to transfer second write data to the buffer memory;
writing an initial portion of the second write data to the buffer memory;
determining an alignment of a final portion of the second write data with respect to the memory bank width of the buffer memory; and
based on a designation of the second client and based on determining that the final portion of the second write data is unaligned with the memory bank width of the buffer memory, performing a read-modify-write operation to write the final portion of the second write data to the buffer memory and preserve previously stored data in the buffer memory.

17. The system of claim 16, wherein the performing the read-modify-write operation comprises:
reading the previously stored data from the buffer memory;
merging the previously stored data with the second write data to generate merged data; and
writing the merged data to the buffer memory.

18. The system of claim 10, wherein:
the incoming write request is a first write request;
the write command is a first write command to transfer first write data to the buffer memory; and
the processing device is to perform further operations comprising:
accessing a second incoming write request received from the client, the second incoming write request comprising a second write command to transfer second write data to the buffer memory;
writing an initial portion of the second write data to the buffer memory;
determining that a final portion of the second write data is aligned with the memory bank width of the buffer memory; and
in response to determining that the final portion of the second write data is aligned with the memory bank width of the buffer memory, writing the final portion of the second write data to the buffer memory.

19. A non-transitory computer-readable storage medium comprising instructions that, when executed by a processing device, cause the processing device to perform operations comprising:
designating each client of a buffer memory as either a burst over-write client or a data preserving client based on a function performed by each client;
accessing an incoming write request received from a client of the buffer memory, the incoming write request comprising a write command to transfer write data to the buffer memory;
writing an initial portion of the write data to the buffer memory;
determining that a final portion of the write data is unaligned with a memory bank width of the buffer memory;
determining a designation of the client by accessing a configuration register that stores client designations for a plurality of clients, the designation of the client indicating whether data previously stored in the buffer memory is to be preserved when writing the final portion of the write data to the buffer memory, the client being designated as either a burst-overwrite client or a data preserving client; and
in response to determining that the final portion of the write data is unaligned with the memory bank width of the buffer memory, determining whether to preserve previously stored data in the buffer memory based on the designation of the client.

20. The non-transitory computer-readable storage medium of claim 19, the operations further comprise:

performing a read-modify-write operation to write the final portion of the write data to the buffer memory and preserve the previously stored data in the buffer memory based on the client being designated as a data-preserving client; and writing the final portion of the write data to the buffer memory without preserving the previously stored data based on the client being designated as a burst-overwrite client.

* * * * *